Aug. 18, 1925. 1,550,479
J. A. WIORA
CHILD'S CONVERTIBLE VEHICLE
Filed April 24, 1924   2 Sheets-Sheet 1

Inventor
Joseph A. Wiora

By F. C. Bryant
Attorney

Aug. 18, 1925.
J. A. WIORA
1,550,479
CHILD'S CONVERTIBLE VEHICLE
Filed April 24, 1924       2 Sheets-Sheet 2
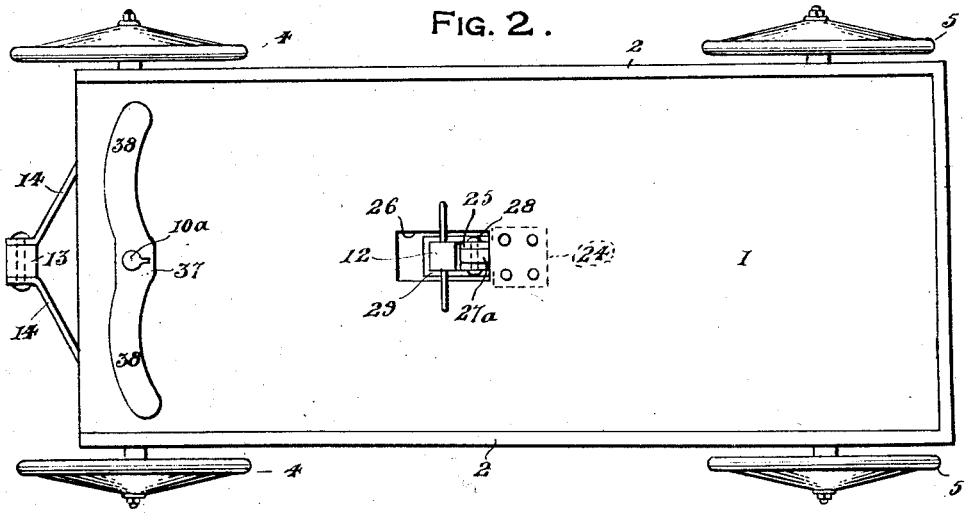
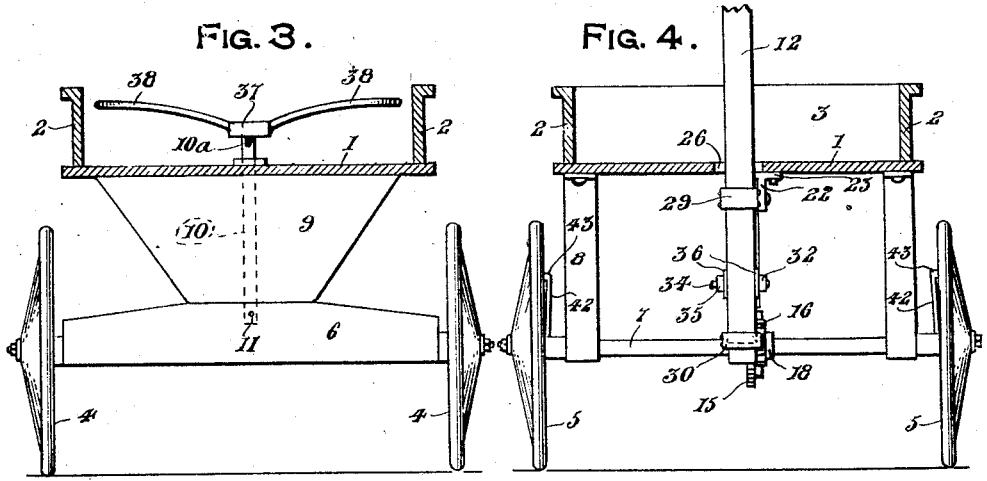
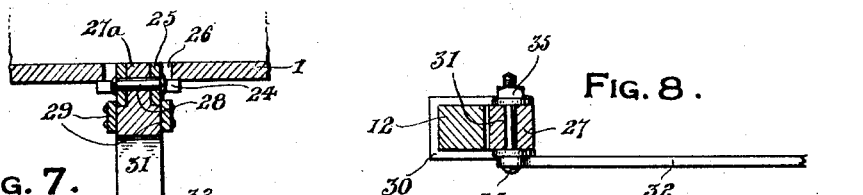
Inventor
Joseph A. Wiora
By T. R. Bryant
Attorney Patented Aug. 18, 1925.

1,550,479

UNITED STATES PATENT OFFICE.

JOSEPH A. WIORA, OF STEVENS POINT, WISCONSIN.

CHILD'S CONVERTIBLE VEHICLE.

Application filed April 24, 1924. Serial No. 708,679.

*To all whom it may concern:*

Be it known that I, JOSEPH A. WIORA, a citizen of the United States of America, residing at Stevens Point, in the county of Portage and State of Wisconsin, have invented certain new and useful Improvements in Children's Convertible Vehicles, of which the following is a specification.

This invention relates to certain new and useful Improvements in a convertible wagon and occupant propelled vehicle wherein a child's wagon provided with the usual handle or tongue has rack and segment mechanism associated with the rear axle supporting the wheels adapted to be manually operated upon removal of the handle or tongue from the front end or front axle of the wagon and associating the same with the rack and segment mechanism.

The invention further includes a convertible wagon and occupant propelled vehicle of the type above set forth, the provision of a cross steering bar operable by the feet and keyed to the upper end of the king bolt that projects perpendicularly from the front axle bar.

The invention further includes a novel type of differential drive for the rear driven wheels in which one rear wheel may be permitted to travel faster than the other rear wheel.

With the above general objects in view and others that will appear as the nature of the invention is better understood, the same consists of the novel form, combination and arrangement of parts hereinafter more fully described, shown in the accompanying drawings and claimed.

Figure 1:
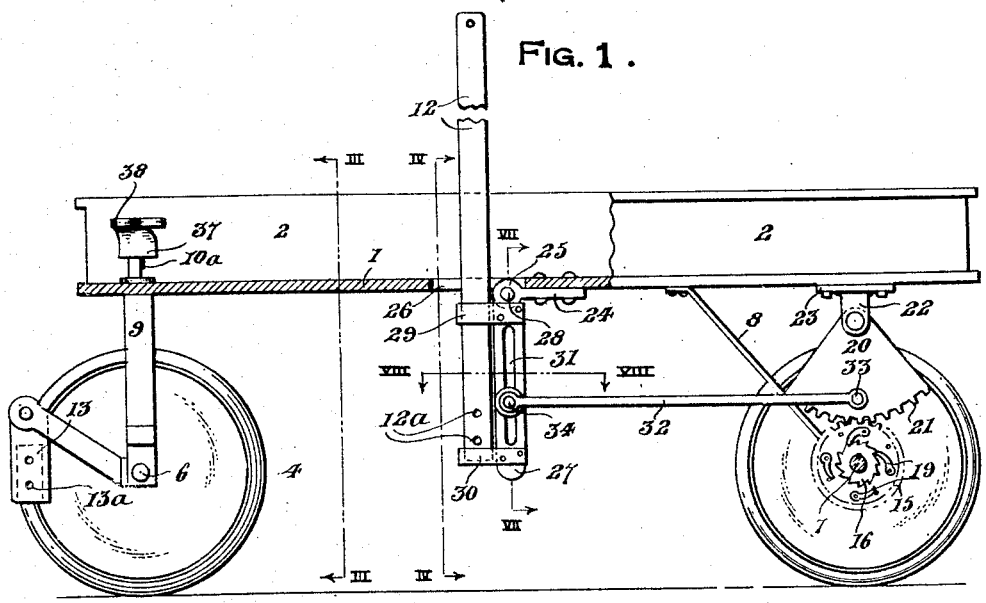
Figure 5:
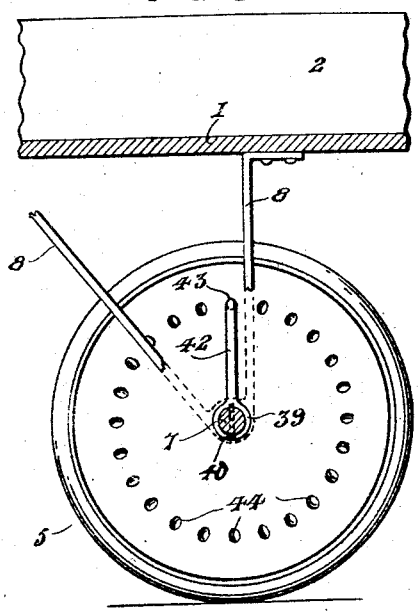
Figure 6:
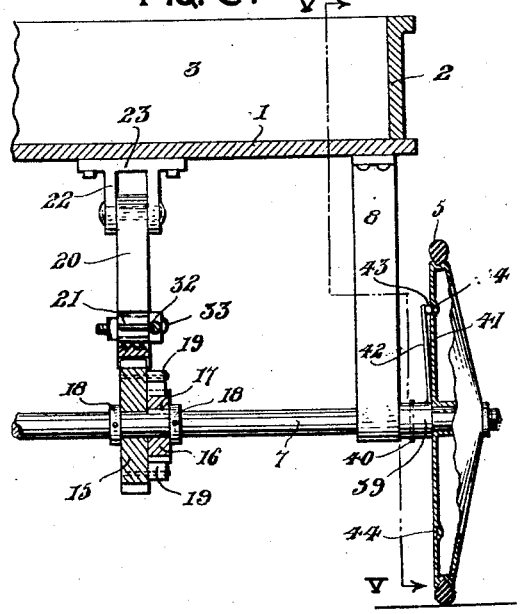

In the drawings, wherein like reference characters designate corresponding parts throughout the several views, Figure 1 is a side elevational view, partly shown in longitudinal section of a convertible wagon and occupant propelled vehicle constructed in accordance with the present invention showing the wagon tongue or handle removed from the front axle and associated with the gear and segment drive for the occupant propelled vehicle, the front board of the wagon being removed to accommodate the mounting and operation of the foot operated steering bar, Figure 2 is a top plan view of the same, Figure 3 is a vertical cross-sectional view taken on line III—III of Fig. 1 showing the foot operated steering bar, Figure 4 is a vertical cross-sectional view taken on line IV—IV of Fig. 1 showing the handle bar or wagon tongue associated with the propelling mechanism, Figure 5 is a vertical sectional view taken on line V—V of Fig. 6 showing the differential drive devices for the rear wheels, Figure 6 is a detail sectional view showing the gear and segment mechanism of the occupant propelled vehicle and the differential arm fixed to the axle having a stud and socket connection with one of the rear wheels, Figure 7 is a detail sectional view taken on line VII—VII of Fig. 1 showing the operating lever for the propelling mechanism, and Figure 8 is a detail sectional view taken on line VIII—VIII of Fig. 1.

The device disclosed in this application refers to a wagon for children of the type embodying a body supported on wheels and having a pulling handle or tongue and having mechanism associated therewith adapting the wagon to be converted into a manually propelled vehicle so that with a slight change, the device may be used either as a wagon or an occupant propelled vehicle. The body of the device includes a bottom wall or board 1 having side walls 2, a rear end wall 3 and a front wall that is capable of being removed when the device is used as an occupant propelled vehicle and not herein illustrated. The wagon body is supported by pairs of front and rear wheels 4 and 5 respectively mounted upon the front and rear axle bars 6 and 7, the rear axle bar 7 being supported beneath the bottom board 1 of the body by supporting brackets 8 while the front axle bar 6 has a relatively wide block 9 interposed between the bottom board 1 and axle bar 6 and is secured in position by the king bolt 10 anchored as at 11 in the axle bar 6 and journaled through the block 9 with its upper end terminating above the floor boards 1 as illustrated in Fig. 3.

When the device is used as a wagon, the same is drawn or propelled by the handle or tongue 12 having one end thereof positioned in the socketed member 13 that is pivotally supported between the bracket arms 14 carried by the axle bar 6 and convergently projecting forwardly thereof as shown in Fig. 2.

The wagon being convertible into an occupant propelled vehicle, manually operable mechanism is associated with the rear axle 9 as well as differential mechanism for driving the rear wheels 5 and includes a gear wheel 15 journaled upon the rear axle 7 juxtaposed to the ratchet wheel 16 that is keyed as at 17 to the rear axle, the gear wheel 15 and ratchet 16 being retained in proper relative positions by the set collars 18 shown more clearly in Fig. 6. A plurality of pivoted pawls 19 are carried by the side face of the gear wheel 15 adjacent the ratchet wheel 16 and cooperate with said ratchet wheel for rotating the same and the rear axle 7 when the gear wheel 15 is rotated. A rack segment 20 provided with teeth 21 upon its lower arcuate edge is pivotally supported at its upper end between the spaced depending lugs 22 carried by the bracket plate 23 secured to the lower face of the bottom board 1 above the gear wheel 15.

The operating means for the rack segment 20 includes a bracket plate 24 secured to the lower face of the bottom board 1 and carrying a pair of forwardly projecting apertured ears 25 in vertical alinement with the elongated opening 26 in the bottom board. An operating lever 27 is reduced at its upper end as at 27$^a$ to be received between the apertured ears 25 for pivotal mounting upon the pin 28 extending between the ears 25 as clearly shown in Figs. 1 and 7. A pair of U-shaped straps 29 and 30 are carried by the upper and lower ends of the lever 27 respectively and extend forwardly of the lever while the lower strap 30 has a closed lower side as indicated in Figs. 1 and 4. The lever 27 is longitudinally slotted as at 31 and a link rod 32 pivotally connected at its rear end as at 33 to the rack segment 20 adjacent the lower end thereof has its forward end pivotally mounted upon the pin 34 freely extending through the slot 31 and retained in vertically adjusted positions by the jam nuts 35 forcing the washers 36 into binding engagement with opposite faces of the lever 27. The handle or tongue 12 is removed from the socketed member 13 and is passed through the opening 26 in the bottom board 1 of the wagon body and through the straps 29 and 30 with the lower end of the tongue supported upon the bottom wall of the lower strap 30.

Steering of the device when used as an occupant propelled vehicle is accomplished by the cross bar 37 having oppositely extending legs 38, the cross bar 37 having a key slot therein that is received upon the upper key end 10$^a$ of the king bolt 10, the side legs 38 being engaged by the feet of a person for steering the front wheels 4 by shifting the axle bar 6.

The differential drive for the rear wheels 5 includes a strap or collar 39 that is keyed as at 40 to each end of the rear axle 7 outwardly of the bracket arms 8 and inwardly of the adjacent disk face 41 of the wheel 5, the collar 39 carrying an outwardly directed arm 42 having a lug 43 upon its outer end that is positioned in one of a circular series of depressions or sockets 44 formed in circular series upon the inner disk face 41 of the wheel. It will therefore be seen that when the axle 7 is rotated, the arm connection 41 with the rear wheel 5 will cause rotation of the latter and should the speed of rotation of the rear wheels be varied or changed as in turning a corner, the weight of the vehicle upon the wheels will cause the lug 43 to escape its associated socket 44 to compensate for different speed of rotation of the two rear wheels, the tension on the arm 42 being sufficient under normal conditions to retain the lug 43 in its associated socket.

When the device is used as a wagon, the tongue 12 is secured in the socketed member 13 by means of a cross pin inserted through registering openings 12$^a$ and 13$^a$ formed in the tongue and socket member and the steering bar 37 is removed from the upper end of the king bolt 10. In using the device as an occupant propelled vehicle, the tongue 12 is disengaged from the socket member and passed through the opening 26 in the bottom board 1 of the wagon body to be received in the guide straps 29 and 30. Upon swinging the tongue 12 and the operating lever 27 connected thereto by the straps 29 and 30, the lever is moved upon its pivotal mounting 28 and by the link rod connection 32 with the rack segment 20, said rack segment is oscillated and causes rotation of the gear wheel 15. The pawls 19 carried by the gear wheel engaging the ratchet wheel 16 effect rotation of the rear axle 7 and the wheels 5 normally free thereon and keyed to the rear axle by the differential mechanism including the arms 42 and the cooperating lug and socket members 43 and 44. The length of throw of the rack segment 20 may be varied by shifting the connecting pin 34 for the forward end of the link rod 32 vertically in the slot 31 of the lever 27. The steering bar 37 is mounted upon the upper key end 10$^a$ of the king bolt and the feet of a person engaging the opposite arms 38 effect proper steering of the coaster.

From the above detail description of the device, it is believed that the construction and operation thereof will at once be apparent, it being noted that a convertible wagon and coaster is herein provided, and while there is herein shown and described the preferred embodiment of the present invention, it is nevertheless to be understood that minor changes may be made therein without departing from the spirit and scope of the invention as claimed.

What is claimed as new is:—

1. In a convertible wagon and occupant propelled vehicle, a wagon body, front and rear axles therefor, ground wheels on the axles, a tongue for the front axle to permit the wagon body to be pulled, pawl and ratchet mechanism connected to the rear axle for permitting the wagon body to be manually driven, said tongue being detachable from the front axle for operating the pawl and ratchet mechanism, and means for locking the rear wheels to the rear axle when the pawl and ratchet mechanism is to be operated.

2. In a convertible wagon and occupant propelled vehicle, a wagon body, front and rear axles therefor, ground wheels on the axles, a tongue for the front axle to permit pulling the wagon body, pawl and ratchet mechanism connected to the rear axle for permitting manual driving of the wagon body, a lever pivoted beneath the wagon body, a link rod connection between the lever and pawl and ratchet mechanism, said tongue being detachable from the front axle for operating the pawl and ratchet mechanism, and means for locking the rear wheels to the rear axle when the pawl and ratchet mechanism is to be operated.

3. In a convertible wagon and occupant propelled vehicle, a wagon body, front and rear axles therefor, ground wheels on the axles, a tongue for the front axle to permit pulling the wagon body, pawl and ratchet mechanism connected to the rear axle to permit manually driving the wagon body, a lever pivoted beneath the wagon body, a link rod connection between the lever and pawl and ratchet mechanism, said tongue being detachable from the front axle for operating the pawl and ratchet mechanism, guide straps carried by the lever for supporting the tongue, and means for locking the rear wheels to the rear axle when the pawl and ratchet mechanism is to be operated.

4. In a convertible wagon and occupant propelled vehicle, a wagon body, front and rear axles, ground wheels on the axles, a tongue for the front axle, pawl and ratchet mechanism connected to the rear axle, said tongue being detachable from the front axle for operating the pawl and ratchet mechanism, the rear wheels being free upon the rear axle, and means fixed to the rear axle and rotatable therewith for locking the rear wheels to the axle.

5. In a convertible wagon and occupant propelled vehicle, a wagon body, front and rear axles, ground wheels on the axles, a tongue for the front axle, pawl and ratchet mechanism connected to the rear axle, a lever pivoted beneath the wagon body, a link rod connection between the lever and pawl and ratchet mechanism, said tongue being detachable from the front axle for operating the pawl and ratchet mechanism, the rear wheels being free upon the rear axle, and means fixed to the rear axle and rotatable therewith for locking the rear wheels to the axle.

6. In a convertible wagon and occupant propelled vehicle, a wagon body, front and rear axles, ground wheels on the axles, a tongue for the front axle, pawl and ratchet mechanism connected to the rear axle, a lever pivoted beneath the wagon body, a link rod connection between the lever and pawl and ratchet mechanism, said tongue being detachable from the front axle for operating the pawl and ratchet mechanism, guide straps carried by the lever for supporting the tongue, the rear wheels being free upon the rear axle, and means fixed to the rear axle and rotatable therewith for locking the rear wheels to the axle.

7. In a convertible wagon and occupant propelled vehicle, a wagon body, axle supporting front and rear wheels therefor, a tongue for the front axle, propelling mechanism connected to the rear axle, said wagon tongue being detachable for operating the propelling mechanism, the rear wheels being free upon the rear axle, means fixed to the rear axle and rotatable therewith for locking the rear wheels to the axle, including a collar keyed to the axle, an arm extending outwardly of the collar and having a lug at its outer end, and each rear wheel including a disk plate having a circular series of depressions with the lug disposed in line with the depressions and forcibly extending into one of the same.

8. In a convertible wagon and occupant propelled vehicle, a wagon body, front and rear axles, ground wheels on the axles, a tongue for the front axle, pawl and ratchet mechanism connected to the rear axle, said tongue being detachable from the front axle for operating the pawl and ratchet mechanism, the rear wheels being free upon the rear axle, means fixed to the rear axle and rotatable therewith for locking the rear wheels to the axle, including a collar keyed to the axle, an arm extending outwardly of the collar and having a lug at its outer end, and each rear wheel including a disk plate having a circular series of depressions with the lug disposed in line with the depressions and forcibly extending into one of the same.

9. In a convertible wagon and occupant propelled vehicle, a wagon body, front and rear axles, ground wheels on the axles, a tongue for the front axle, pawl and ratchet mechanism connected to the rear axle, a lever pivoted beneath the wagon body, a link rod connection between the lever and pawl and ratchet mechanism, said tongue being detachable from the front axle for operating the pawl and ratchet mechanism, the rear wheels being free upon the rear axle, means fixed to the rear axle and rotatable therewith for locking the rear wheels to the axle including a collar keyed to the axle, an arm extending outwardly of the collar and having a lug at its outer end, and each rear wheel including a disk plate having a circular series of depressions with the lug disposed in line with the depressions and forcibly extending into one of the same.

10. In a convertible wagon and occupant propelled vehicle, a wagon body, front and rear axles, ground wheels on the axles, a tongue for the front axle, pawl and ratchet mechanism connected to the rear axle, a lever pivoted beneath the wagon body, a link rod connection between the lever and pawl and ratchet mechanism, said tongue being detachable from the front axle for operating the pawl and ratchet mechanism, guide straps carried by the lever for supporting the tongue, the rear wheels being free upon the rear axle, means fixed to the rear axle and rotatable therewith for locking the rear wheels to the axle, including a collar keyed to the axle, an arm extending outwardly of the collar and having a lug at its outer end, and each rear wheel including a disk plate having a circular series of depressions with the lug disposed in line with the depressions and forcibly extending into one of the same.

11. In a vehicle of the type described, a wagon body, front and rear axles and ground supporting wheels therefor, the rear wheels being journaled on the rear axle, the rear wheels being of disk formation with a circular series of depressions formed therein and a resilient arm fixed to the axle and projecting outwardly thereof with the outer terminal end fashioned for selective seating reception in the depressions.

12. In a convertible wagon and occupant propelled vehicle, a wagon body, front and rear axles and ground wheels for the wagon, propelling mechanism connected to the rear axle, means detachably connected with the propelling mechanism to effect operation thereof, and means manually rendered operative or inoperative for connecting or disconnecting the rear wheels to the rear axle, said last mentioned means also acting as a compensating mechanism to permit the rear wheels to turn at different speeds when describing curves.

13. A device of the character described including a wheeled vehicle having mechanism for adapting the conversion of the vehicle from a free wheeled wagon to a manually rear wheel propelled vehicle, said mechanism also acting as a compensating means to permit the rear wheels to turn at different speeds when describing curves.

14. In a vehicle of the type described, a wagon body, front and rear axles and ground supporting wheels therefor, the rear wheels being journaled on the rear axle, means for rotating the rear axle, and means for selectively locking the rear wheels on their axle, said last mentioned means also acting as a compensating mechanism to permit the rear wheels to turn at different speeds when describing curves.

15. In a vehicle of the type described, a wagon body, front and rear axles and ground supporting wheels therefor, the rear wheels being journaled on the rear axle, the rear wheels being of disk formation with a circular series of depressions formed therein, and a resilient arm fixed to the axle and projecting outwardly therefrom with the outer terminal end fashioned for selective seating reception in the depressions and for escaping from one depression to another for permitting the rear wheels to turn at different speeds when describing curves.

In testimony whereof I affix my signature.

JOSEPH A. WIORA.